US012617118B2

(12) United States Patent
Yu et al.

(10) Patent No.: US 12,617,118 B2
(45) Date of Patent: May 5, 2026

(54) POWER TOOL

(71) Applicant: Greenworks (Jiangsu) Co., Ltd.,
Changzhou (CN)

(72) Inventors: Xinxin Yu, Changzhou (CN); Lingao Zhang, Changzhou (CN)

(73) Assignee: Greenworks (Jiangsu) Co., Ltd.,
Changzhou (CN)

( * ) Notice: Subject to any disclaimer, the term of this patent is extended or adjusted under 35 U.S.C. 154(b) by 186 days.

(21) Appl. No.: 18/505,120

(22) Filed: Nov. 9, 2023

(65) Prior Publication Data

US 2024/0075649 A1     Mar. 7, 2024

Related U.S. Application Data

(63) Continuation of application No. PCT/CN2022/092223, filed on May 11, 2022.

(30) Foreign Application Priority Data

| May 21, 2021 | (CN) | .......................... 202121107942.1 |
| May 21, 2021 | (CN) | .......................... 202121111547.0 |
| May 21, 2021 | (CN) | .......................... 202121111753.1 |
| May 21, 2021 | (CN) | .......................... 202121113117.2 |

(51) Int. Cl.
  *B27B 17/12*        (2006.01)
  *A01G 3/08*         (2006.01)

(52) U.S. Cl.
  CPC .............. B27B 17/12 (2013.01); *A01G 3/086* (2013.01)

(58) Field of Classification Search
  CPC .................................................... B27B 17/12
  See application file for complete search history.

(56) References Cited

U.S. PATENT DOCUMENTS

| 2004/0256308 A1* | 12/2004 | Yates ................... B01D 35/153 |
| | | 210/416.1 |
| 2017/0066119 A1 | 3/2017 | Fu et al. |
| 2017/0120471 A1* | 5/2017 | Kawamura ............. B27B 17/12 |
| 2018/0099396 A1 | 4/2018 | Iida et al. |

FOREIGN PATENT DOCUMENTS

| CN | 104054521 A | 9/2014 |
| CN | 106499935 A | 3/2017 |
| CN | 208754706 U | 4/2019 |
| CN | 210436297 U | 5/2020 |
| CN | 111376351 A | 7/2020 |
| CN | 112706044 A | 4/2021 |
| DE | 102018210203 A1 * | 12/2018 ............. B27B 17/00 |
| JP | 2004105834 A | 4/2004 |

* cited by examiner

*Primary Examiner* — Jennifer S Matthews

(57)     ABSTRACT

A power tool includes a housing, a driving device, a cutting device and an oil storage device. The driving device, the cutting device and the oil storage device are all mounted in the housing. The driving device may drive the cutting device to work, and the oil storage device provides lubricating oil to the cutting device. The oil storage device includes an oil reservoir and an oil pump, the oil reservoir is connected with the oil pump through a first oil pipe, and a filtering structure is arranged between the first oil pipe and the oil reservoir to filter the lubricating oil entering the oil pump from the oil reservoir. The oil reservoir provides lubricating oil to the cutting device through the oil pump. The oil storage device of the disclosure may effectively improve a clogging problem of the oil pump and improve a duration life of the power tool.

16 Claims, 14 Drawing Sheets

POWER TOOL

CROSS REFERENCE TO RELATED APPLICATION

The present application is a continuation Application of PCT application No. PCT/CN2022/092223 filed on May 11, 2022, which claims the benefit of CN202121113117.2 filed on May 21, 2021, CN202121111547.0 filed on May 21, 2021, CN202121111753.1 filed on May 21, 2021, CN202121107942.1 filed on May 21, 2021. All the above are hereby incorporated by reference.

TECHNICAL FIELD

The disclosure relates to a technical field of cutting tools, in particular to a power tool.

BACKGROUND

Power tools usually need lubricating oil to lubricate the cutting parts, but since there is a lot of dust in the cutting environment, impurities around the tool will fall into the oil reservoir, and the oil pump will easily cause blockage inside the oil pump after the impurities are sucked in, which results in the failure of the lubrication system of the power tool and affect the duration life of power tools.

SUMMARY

The disclosure provides a power tool to improve a problem of internal clogging of an oil pump of an oil storage device.

The disclosure provides a power tool, including a housing, a driving device, a cutting device and an oil storage device. The driving device is arranged in the housing. The cutting device is arranged in the housing and driven by the driving device. The oil storage device is arranged in the housing and used to provides lubricating oil to the cutting device. Wherein, the oil storage device includes an oil reservoir and an oil pump, the oil reservoir is connected with the oil pump through a first oil pipe, and a filtering structure is arranged between the first oil pipe and the oil reservoir to filter the lubricating oil entering the oil pump from the oil reservoir. The oil reservoir provides the lubricating oil to the cutting device through the oil pump.

In an embodiment of the disclosure, the oil reservoir is provided with an oil reservoir outlet connected with the first oil pipe, the filtering structure includes a claw, a first filter body and a filter spring, the claw is arranged on an end of the first oil pipe connected with the oil reservoir outlet, the claw is provided with a first oil inlet hole communicating with the first oil pipe, the first filter body is arranged on the in the claw, and the filter spring is sleeved on the claw and fixes the first filter body in the claw.

In an embodiment of the disclosure, the claw includes a pipe part, a claw plate and claw teeth connected sequentially, an outer diameter of the pipe part fits an inner diameter of the first oil pipe, a diameter of the claw plate is larger than an outer diameter of the first oil pipe, the claw plate is provided with the first oil inlet hole communicating with the pipe part, and the claw teeth are arranged at intervals along a circumferential direction of the claw plate to enclose an accommodating cavity of the first filter body.

In an embodiment of the disclosure, the first filter body is a filter sponge.

In an embodiment of the disclosure, the filter spring includes a cylindrical spring and a conical spring, the cylindrical spring is sleeved outside the claw, and the conical spring is blocked on an opening of the claw.

In an embodiment of the disclosure, a joint of the first oil pipe and the oil reservoir outlet is provided with a leak-proof structure, the leak-proof structure includes a cylindrical outer wall, a first flange and a second flange arranged on two sides of the cylindrical outer wall, the cylindrical outer wall fits on an outer wall of the first oil pipe and coupled with the oil reservoir outlet, the first flange is located inside the oil reservoir outlet, the second flange is located outside the oil reservoir outlet, and the first flange and the second flange are pressed tightly on surrounding walls of the oil reservoir outlet and seal the surrounding walls of the oil reservoir outlet.

In an embodiment of the disclosure, an outer side of the second flange is provided with a third flange connected with the second flange.

In an embodiment of the disclosure, a joint of the oil reservoir and the first oil pipe is provided with an oil nozzle protruding from a surface of the oil reservoir, the filtering structure includes a filter bracket and a second filter body, the second filter body is arranged in the filter bracket, and the filter bracket is arranged in the oil nozzle.

In an embodiment of the disclosure, the filter bracket includes a filter tube and a blocking part arranged at an end of the filter tube, the blocking part is provided with a through hole communicating with the filter tube, an outer diameter of the filter tube fits an inner diameter of the oil nozzle, and an outer diameter of the blocking part is larger than an outer diameter of the oil nozzle.

In an embodiment of the disclosure, a side wall of the filter tube is provided with a plurality of second oil inlet holes along a circumference, and the second filter body is distributed in the second oil inlet holes.

In an embodiment of the disclosure, the second filter body is a filter screen, and the filter bracket and the filter screen are integrally structured.

In an embodiment of the disclosure, an inner diameter of the first oil pipe fits an outer diameter of the oil nozzle, and the first oil pipe is tightly sleeved on the oil nozzle.

In an embodiment of the disclosure, the oil storage device further includes an oil reservoir cap, the oil reservoir cap includes a cover body, a cavity, a one-way venting structure and a pulling wire, the cover body is screwed to the oil reservoir inlet, and the cavity is arranged inside of the cover body and is concave toward the oil reservoir, a side of the cavity away from the oil reservoir is provided with an air inlet hole, a side of the cavity facing the oil reservoir is provided with an air outlet, the one-way venting structure is arranged in the cavity, a first end of the pulling wire is connected to the cover body on one side of the cavity, and a second end of the pulling wire extends into the oil reservoir to be connected with a blocking body that is capable of entering the oil reservoir.

In an embodiment of the disclosure, the one-way venting structure includes a one-way air intake valve and a third filter body, the one-way air intake valve is arranged in the cavity, and the third filter body is arranged in the air inlet hole to seal the air inlet hole.

In an embodiment of the disclosure, a blocking body is a tapered bracket capable of elastic deformation, and a size of a large end of the tapered bracket is larger than a diameter of an oil reservoir inlet.

In an embodiment of the disclosure, a mounting hole for pulling wire is provided in the cover body, and a circular concave cavity is arranged in the mounting hole. A sphere matching the circular concave cavity is provided at an end of the pulling wire, and the pulling wire is clamped in the circular concave cavity through the sphere.

In an embodiment of the disclosure, the third filter body is a copper powder sintered filter element.

In an embodiment of the disclosure, a sealing ring is further arranged in the cover body.

In an embodiment of the disclosure, the driving device includes a driving motor, and the driving motor is a brushed motor or a brushless motor.

In an embodiment of the disclosure, the housing includes a first housing, a second housing and a motor supporting pad, an interior of the first housing is provided with a plurality of first supporting ribs, positions of an interior of the second housing corresponding to the first supporting ribs are provided with a plurality of second supporting ribs, after the first housing is fastened with the second housing, the first supporting ribs and the second supporting ribs enclose to form a motor accommodating cavity that matches a brushed motor, the motor supporting pad is detachably arranged on the first supporting rib and the second supporting rib, and an inner diameter of the motor supporting pad fits a size of a brushless motor.

In an embodiment of the disclosure, a side surface of the motor supporting pad in contact with the first supporting ribs and the second supporting ribs is provided with a washer groove to accommodate the supporting ribs, and the side surface of the motor supporting pad in contact with the brushless motor is provided with an arc-shaped matching surface matched with the brushless motor.

In an embodiment of the disclosure, the motor supporting pad includes a first rubber pad mounted on the first supporting rib and a second rubber pad mounted on the second supporting rib, and the first rubber pad and the second rubber pad are mounted correspondingly.

In an embodiment of the disclosure, a clamping groove for accommodating a housing supporting pillar of the brushless motor is arranged on a side of the motor supporting pad away from the first supporting rib and the second supporting rib.

In an embodiment of the disclosure, the motor accommodating cavity includes a first cavity accommodating a head of the motor, a second cavity accommodating a main body of the motor and a third cavity accommodating an output end of the motor.

In an embodiment of the disclosure, both the first housing and the second housing are provided with windshields corresponding to the motor accommodating cavity.

In an embodiment of the disclosure, the motor supporting pad is detachably mounted on supporting ribs in the second cavity, and the motor supporting pad separates the windshield located in the first cavity from the windshield located in the third cavity.

The oil storage device of the power tool of the disclosure may effectively filter large particles of impurities in the lubricating oil entering the oil pump from the oil reservoir through mounting the filtering structure between the first oil pipe and the oil reservoir, thereby improving the clogging problem of the oil pump. The disclosure provides two different filtering structures, one is mounted at the end of the first oil pipe, and the impurities in the lubricating oil are filtered out by a double filter of the filter body and the filter spring, which avoids the clogging of the oil pump and enables it to effectively lubricate a saw chain. The other includes a filter bracket and a filter screen. A specification of the filter screen may be selected according to a working environment of the tool and an oil filter hole inside the oil pump. This filtering structure is small in size and may be used in small oil reservoirs and irregular blowing molding oil reservoirs with oil nozzles, which may efficiently filter large particles in lubricating oil, avoid clogging the oil pump, and improve a duration life of power tools.

The oil storage device of the power tool of the disclosure further improves a structure of the oil reservoir cap. The cavity is arranged inside the cover body. A side of the cavity facing away from the oil reservoir is provided with the air inlet holes, and the side of the cavity facing the oil reservoir is provided with the air outlet holes. Air entering from the air inlet holes can only enter the oil reservoir through the air outlet holes of the cavity, and an area outside the cavity is a sealed structure to increase a sealing of the oil reservoir. In addition, the one-way venting structure is arranged in the cavity, which may allow outside air to enter the cavity, but can prevent liquid in the oil reservoir from overflowing from the one-way venting structure. It can not only replenish the air in time during a suction process of the suction device, but also prevent the oil in the oil reservoir from overflowing to cause loss and leakage pollution. An inside of the oil reservoir cap is provided with an anti-loss pulling wire, and the pulling wire and the cavity are arranged at different positions, which prevents the oil from overflowing from where the pulling wire is mounted.

A detachable motor supporting pad is arranged in the housing of the power tool of the disclosure, so that a same housing system may be compatible with brushed motors and brushless motors, and users may choose to mount the brushed motor or brushless motor according to individual needs. Moreover, the motor supporting pad separates the air inlet at a front end of the brushless motor from fan blades at a rear end of the brushless motor, so as to avoid affecting a heat dissipation of the motor due to turbulent wind and scattered wind, and improve effective working time of the motor.

PART NUMBER DESCRIPTION

1—housing; 2—driving motor; 3—transmission device; 4—cutting device; 5—connecting rod; 6—oil storage device; 100—first housing; 101—first supporting rib; 110—second housing; 111—second supporting rib; 120—motor accommodating cavity; 121—first cavity; 122—second cavity; 123—third cavity; 130—motor supporting pad; 131—first rubber pad; 132—second rubber pad; 133—washer groove; 134—washer matching surface; 135—clamping groove; 140—windshield; 150—transmission device accommodating cavity; 160—oil storage device accommodating cavity; 170—connecting rod accommodating cavity; 21—brushed motor; 22—brushless motor; 23—motor bracket; 300—sprocket driving shaft; 310—driven bevel gear; 320—driving bevel gear; 330—sprocket; 400—saw chain; 410—guide bar; 420—bar plate pad; 401—tie strap; 402—drive link; 403—cutter; 411—guiding groove; 600—oil reservoir; 610—oil reservoir cap; 620—oil pump; 630—first oil pipe; 640—second oil pipe; 650—first filtering structure; 660—second filtering structure; 601—oil reservoir outlet; 602—oil reservoir inlet; 611—cover body; 612—cavity; 613—one-way venting structure; 614—sealing ring; 615—pulling wire; 616—blocking body; 6111—thread structure; 6112—air inlet; 6113—anti-skid protrusion; 6114—third conical surface; 6115—matching surface; 6121—air outlet; 6131—one-way air intake valve; 61311—air intake slit; 6132—third filter body; 6141—annular groove; 6151—mounting hole; 6152—circular concave cavity; 6153—opening groove; 6154—sphere; 6201—oil pump cam; 6501—claw; 6502—first filter body; 6503—filter spring; 65011—pipe part; 65012—claw plate; 65013—claw teeth; 65031—cylindrical spring; 65032—conical spring; 6301—leak-proof structure; 63011—cylindrical outer wall; 63012—first flange; 63013—second flange; 63014—third flange; 6601—oil nozzle; 6602—filter bracket; 66011—second conical surface; 66021—filter tube; 66022—blocking part; 66023—oil inlet hole; 66024—through hole; 66025—first conical surface.

DETAILED DESCRIPTION

The following describes the implementation of the disclosure through specific embodiments, and those skilled in the art may easily understand other advantages and effects of the disclosure from the content disclosed in this specification. The disclosure may also be implemented or applied through other different specific embodiments. Various details in this specification may also be modified or changed based on different viewpoints and applications without departing from the disclosure.

Please refer to FIG. 1 through FIG. 31. The disclosure provides a power tool, used to improve a clogging problem of an oil pump in an oil storage device.

Figure 1:
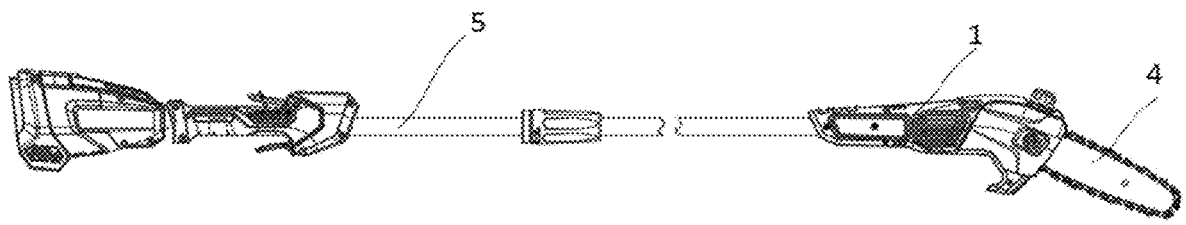
FIG. 1 is a schematic structural view of a power tool of the disclosure in an embodiment.
Figure 2:
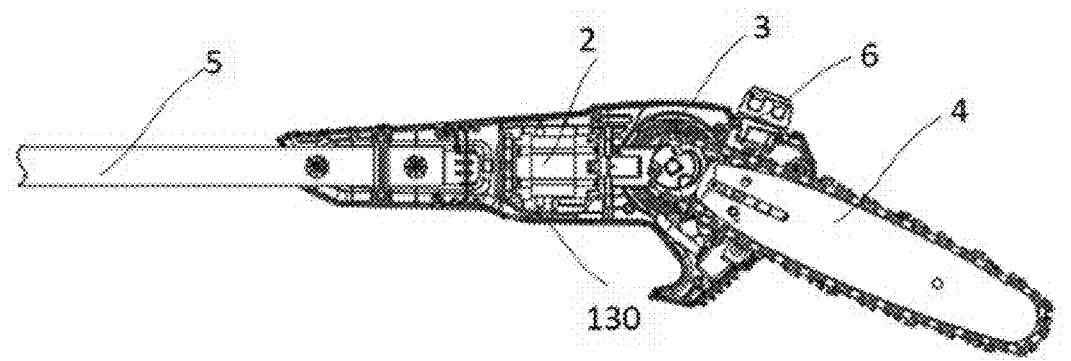
FIG. 2 is a partial schematic view of the power tool of the disclosure after part of a housing is removed.

Please refer to FIG. 1 and FIG. 2. The power tool of the disclosure includes a housing 1, a driving device, a cutting device 4 and an oil storage device 6, wherein, the driving device, cutting device 4 and oil storage device 6 are mounted in the housing 1. The driving device includes a driving motor 2 and a transmission device 3. The driving motor 2 may be a brushed motor or a brushless motor. The transmission device 3 may transmit power of the driving motor 2 to the cutting device 4. The oil storage device 6 is arranged on a side of the housing 1 close to the cutting device 4 to provide lubricating oil to the cutting device 4 for lubrication and cooling.

Figure 3:
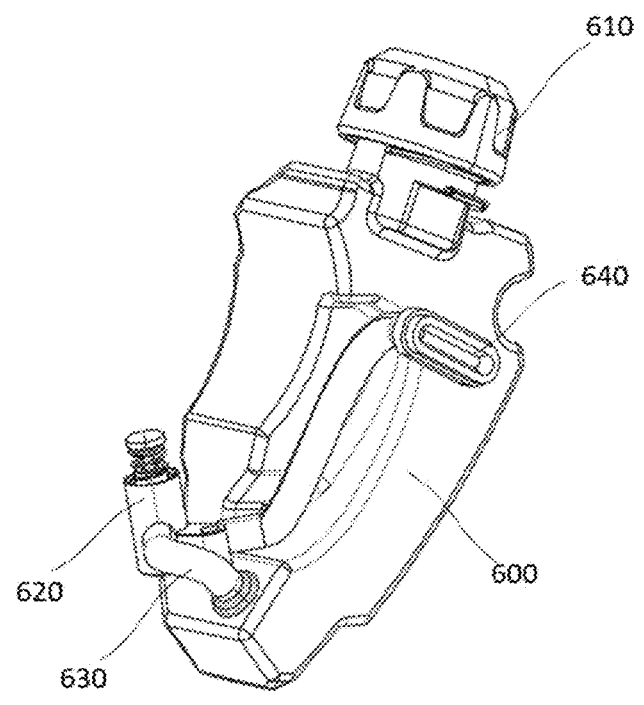
FIG. 3 is a schematic structural view of an oil storage device in an embodiment of the power tool of the disclosure.
Figure 6:
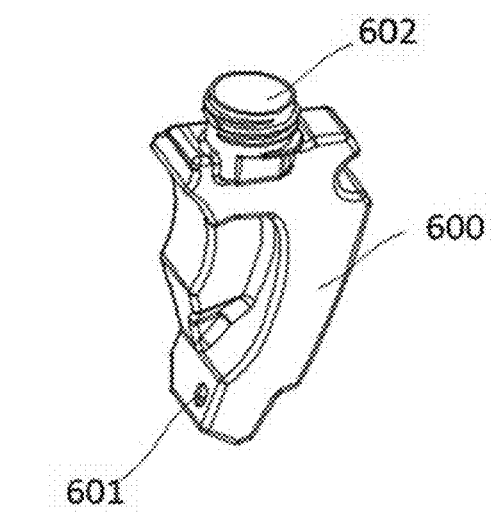
FIG. 6 is a schematic structural view of an oil reservoir in FIG. 4.

Please refer to FIG. 3 and FIG. 6. The oil storage device 6 includes an oil reservoir 600 and an oil pump 620. The oil reservoir 600 is connected with the oil pump 620 through a first oil pipe 630. A filtering structure is arranged between the first oil pipe 630 and the oil reservoir 600 for filtering large particles of impurities in lubricating oil entering the oil pump 620 from the oil reservoir 600 to prevent large particles of impurities from clogging the oil pump. Specifically, the oil reservoir 600 is provided with an oil reservoir outlet 601 and an oil reservoir inlet 602. For example, the oil reservoir outlet 601 is arranged at a bottom of the oiler 600, the oil inlet of the oil reservoir inlet 602 is arranged at an upper part of the oil reservoir, and the oil inlet of the oil reservoir inlet 602 is provided with an oil reservoir cap 610. A first end of the first oil pipe 630 is connected with the oil reservoir outlet 601, and a second end is connected with an oil suction port of the oil pump 620. A first end of the second oil pipe 640 is connected with an oil discharge port of the oil pump 620, and a second end of the second oil pipe 640 extends to a part of the cutting device 4 to be lubricated. The oil pump 620 may be a plunger pump, and a suction of the plunger pump is controlled by an oil pump cam 6201 arranged on a sprocket driving shaft 300 (see FIG. 26).

Figure 4:
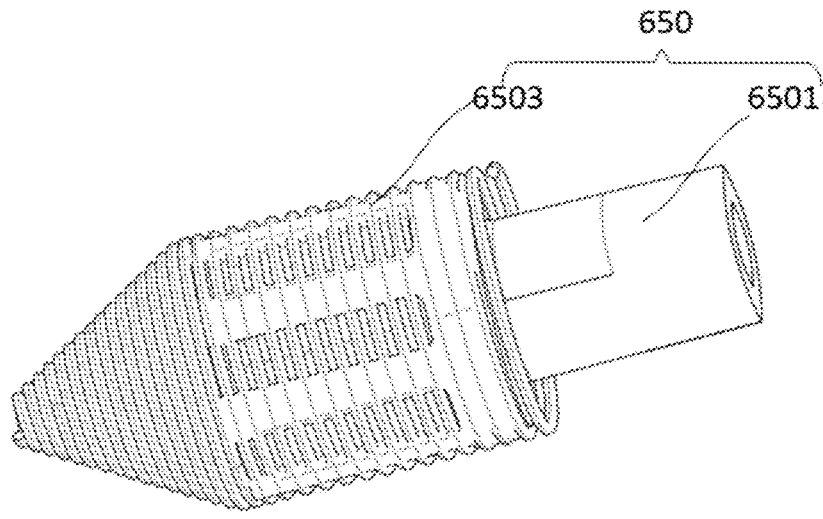
FIG. 4 is a schematic view of a filtering structure in FIG. 3.
Figure 5:
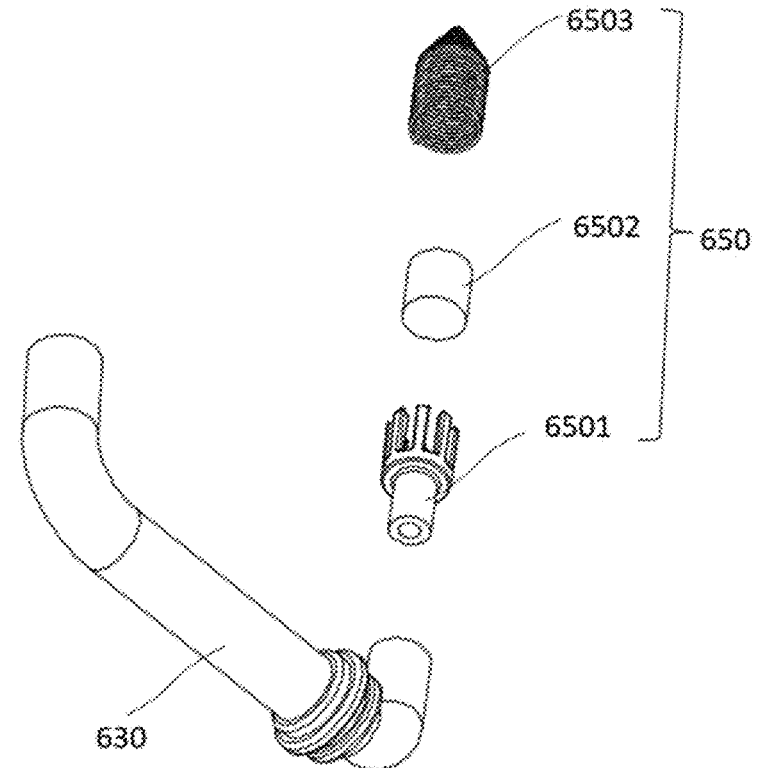
FIG. 5 is an exploded schematic view of the filter structure in FIG. 3.

Please refer to FIG. 3 through FIG. 5. In one embodiment, the filtering structure is arranged at an end where the first oil pipe 630 is connected with the oil reservoir outlet 601 of the oil reservoir, which is marked as a first filtering structure 650. The first filtering structure 650 includes a claw 6501, a first filter body 6502 and a filter spring 6503, the claw 6501 is mounted at an end of the first oil pipe 630, the claw 6501 is provided with an oil inlet hole communicating with the first oil pipe 630, the first filter body 6502 is mounted in the claw 6501, and the filter spring 6503 is sleeved on the claw 6501 and fixes the first filter body 6502 in the claw 6501.

Figure 7:
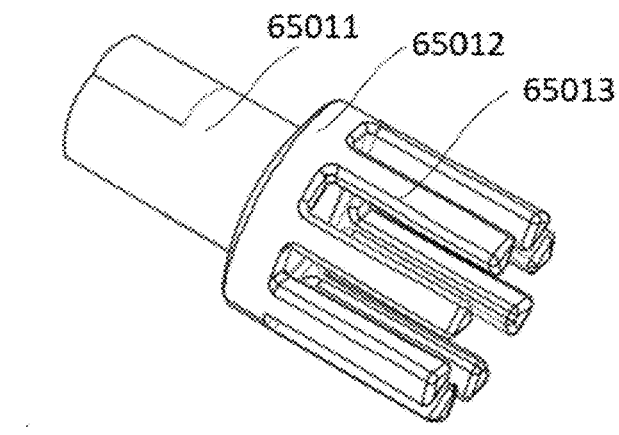
FIG. 7 is a schematic structural view of a claw in FIG. 5.
Figure 8:
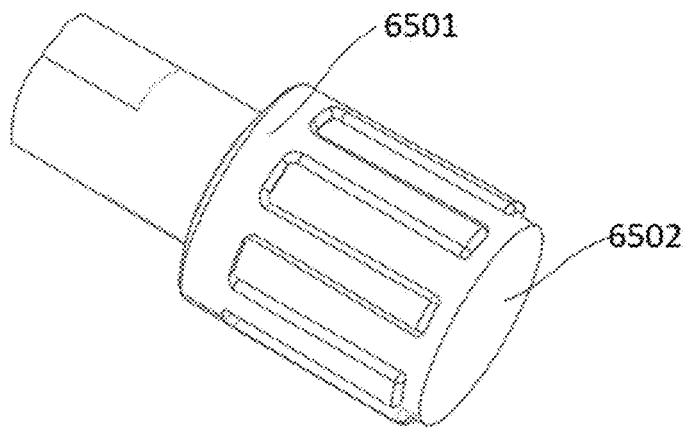
FIG. 8 is a schematic structural view of the claw and a first filter body in FIG. 5.

Please refer to FIG. 5, FIG. 7 and FIG. 8. As an example, the claw 6501 includes a pipe part 65011, a claw plate 65012 connected with the pipe part 65011, and claw teeth 65013 arranged on a side of the claw plate 65012 away from the pipe part 65011. The claw plate 65012 is provided with the oil inlet hole connected with the pipe part 65011. An outer diameter of the pipe part 65011 matches a diameter of an end of the first oil pipe 630. The first oil pipe 630 is a rubber oil pipe. Through using an elasticity of rubber material, the pipe part 65011 is inserted into the first oil pipe 630 and tightens the first oil pipe 630. After the pipe part 65011 is inserted into the first oil pipe 630, the claw plate 65012 stops at the first oil pipe 630. The claw teeth 65013 are arranged at intervals along a circumference of the claw plate 65012, the claw teeth 65013 enclose to form an accommodating cavity of the first filter body 6502, and the first filter body 6502 fills the accommodating cavity surrounded by claw teeth 65013. In some embodiments, the claw teeth 65013 are substantially in a shape of a triangular prism, and one of side edges of the triangular prism faces the first filter body 6502. In order to prevent the first filter body 6502 from being scratched by the edge of the triangular prism, a side edge of the triangular prism facing the filter body may be cut into a plane and rounded. A circular groove matching a diameter of the first filter body 6502 is arranged on a side of the claw plate 65012 facing the first filter body 6502. The first filter body 6502 is clamped inside the circular groove. The first filter body 6502 may be a filter sponge or other filter bodies with filter performance.

Figure 9:
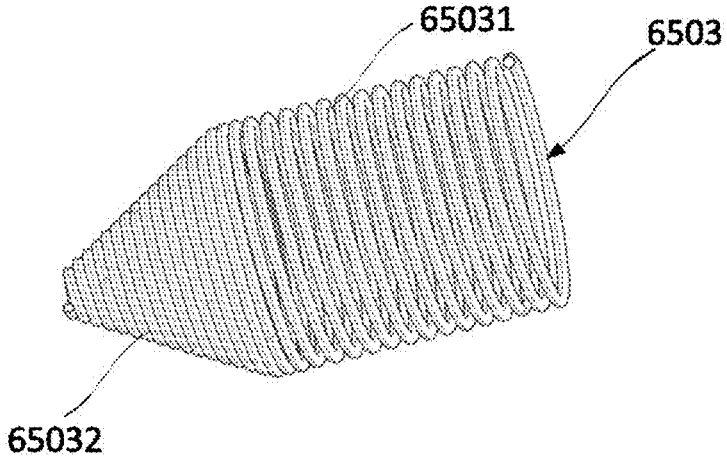
FIG. 9 is a schematic structural view of a filter spring in FIG. 5.

Please refer to FIG. 4, FIG. 5 and FIG. 9. As an example, the filter spring 6503 includes a cylindrical spring 65031 and a conical spring 65032. The conical spring 65032 is arranged at one end of the cylindrical spring 65031 and connected with it as a whole. The cylindrical spring 65031 is sleeved outside the claw 6501, and holds the filter body 6502 in the claw 6501 tightly, and the conical spring 65032 blocks an opening of the claw 6501 to prevent the first filter body 6502 from falling off from the claw 6501. Gaps between steel wires of the filter spring 6503 may also play a layer of oil filtering effect, so as to realize a double filtration of the filter structure, so that the lubricating oil entering the oil pump 620 does not contain large particles of dirt and impurities, and can lubricate the cutting device for a long time.

Figure 10:
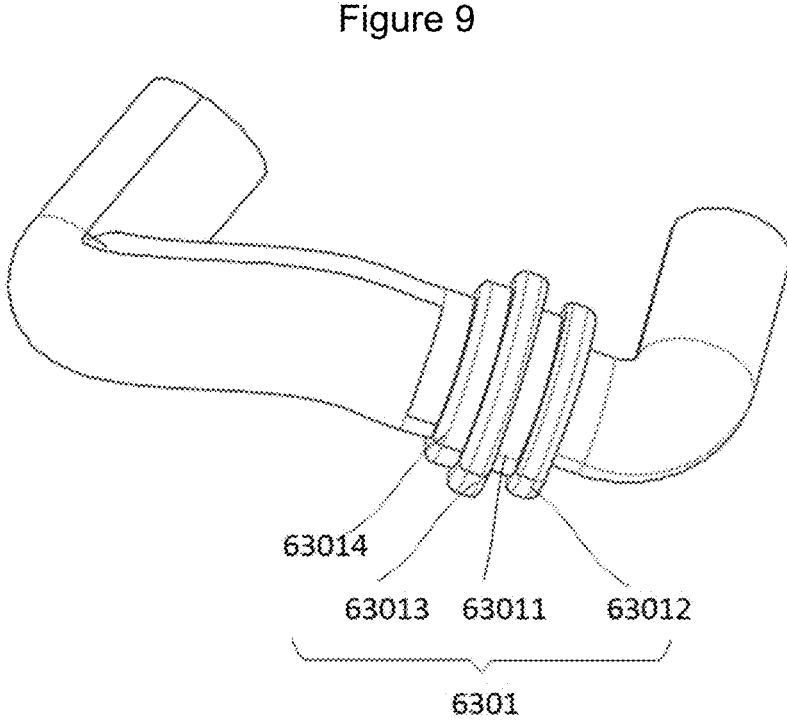
FIG. 10 is a schematic structural view of a first oil pipe in FIG. 5.

Please refer to FIG. 3, FIG. 6 and FIG. 10. As an example, the oil reservoir outlet 601 is a circular hole, a first end of the first oil pipe 630 mounted with the first filtering structure 650 is inserted into the circular hole, and a second end of the first oil pipe 630 is connected with the oil suction port of the oil pump 620. In order to prevent oil leakage at a connection between the first oil pipe 630 and the oil reservoir outlet 601, a leak-proof structure 6301 is arranged at the connection between the first oil pipe 630 and the oil reservoir outlet 601. The leak-proof structure 6301 is elastic, and may be bonded to the first oil pipe 630, or integrally formed with the first oil pipe 630. The leak-proof structure 6301 includes a cylindrical outer wall 63011 matched with the oil reservoir outlet 601, and a first flange 63012 and a second flange 63013 respectively arranged at both ends of the cylindrical outer wall 63011. The cylindrical outer wall 63011 is interference-fit to the oil reservoir outlet 601 to form a radial sealing structure. The first flange 63012 is located inside the oil reservoir outlet 601, and the second flange is located outside the oil reservoir outlet 601. The first flange 63012 and the second flange 63013 rely on its own elastic force to press tightly on surrounding walls of the oil reservoir outlet 601 to form an end face sealing structure and seal the surrounding walls of the oil reservoir outlet. In some embodiments, an outer side of the second flange 63013 is further provided with a third flange 63014 connected thereto, which serves to strengthen a seal. A first end of the second oil pipe 640 is connected with the oil discharge port of the oil pump 620, and a second end of the second oil pipe 640 extends to a part of the cutting device 4 to be lubricated or cooled.

Figure 11:
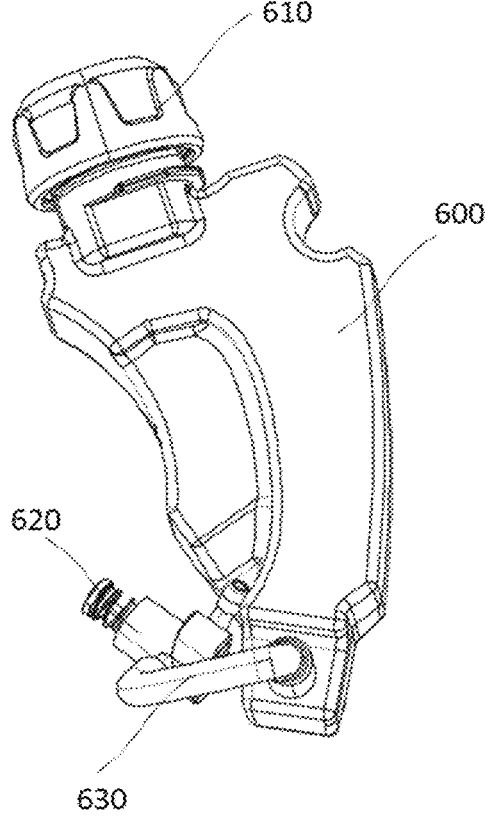
FIG. 11 is a schematic structural view of the oil storage device in another embodiment of the power tool of the disclosure.
Figure 12:
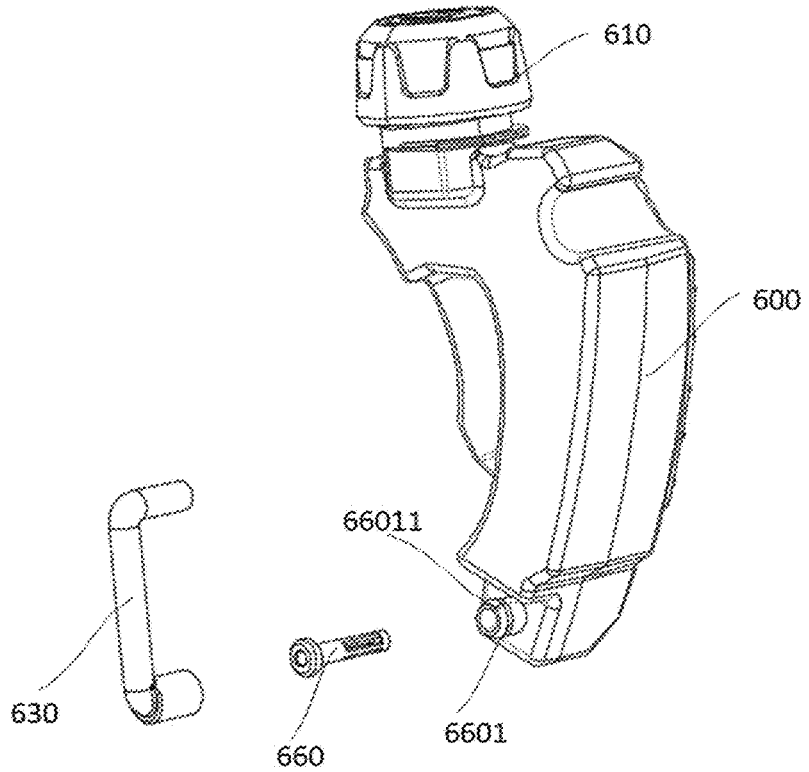
FIG. 12 is an exploded schematic view of the FIG. 11
Figure 13:
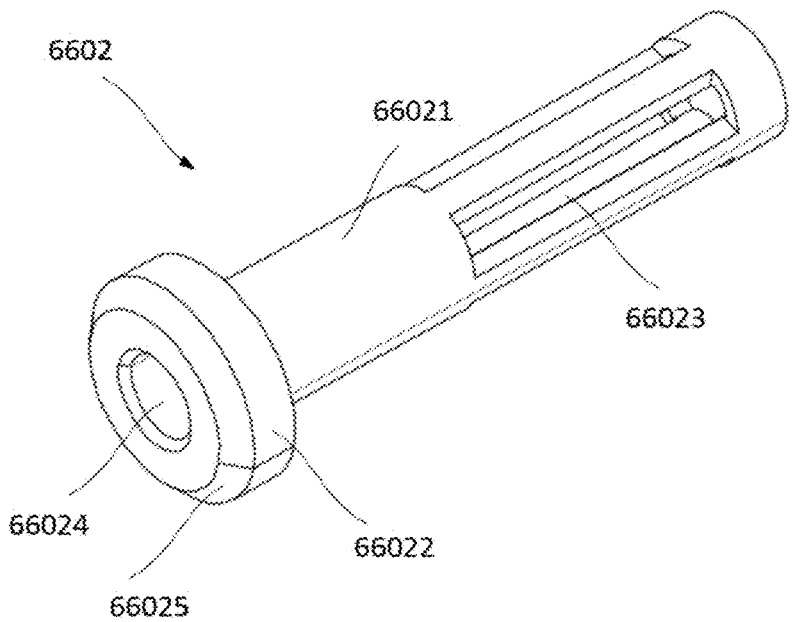
FIG. 13 is a schematic structural view of a filter bracket in FIG. 12.

Please refer to FIG. 11 through FIG. 13. In another embodiment, the filtering structure may also be arranged in the oil reservoir outlet 601, which is marked as a second filtering structure 660. In this embodiment, the oil reservoir outlet 601 is provided with an oil nozzle 6601 protruding from the oil reservoir outlet 601. The second filtering structure 660 is arranged in the oil nozzle 6601. The second filtering structure 660 includes a filter bracket 6602 and a second filter body (not shown in the figure) arranged in the filter bracket 6602. The filter bracket 6602 is interference-inserted into the oil nozzle 6601, an end of the first oil pipe 630 is sleeved on the oil nozzle 6601, and the filter bracket is pressed into the oil nozzle 6601 tightly. The filter bracket 6602 includes a filter tube 66021 and a blocking part 66022 arranged at an end of the filter tube 66021. The blocking part 66022 is provided with a through hole 66024 that communicates with the filter tube 66021. The blocking part 66022 is blocked on the oil nozzle 6601. A surface of the blocking part 66022 that fits the oil nozzle 6601 is provided with a matching surface that matches the oil nozzle 6601. In some embodiment, one end of the blocking part 66022 away from the filter tube 66021 is provided with a conical surface, which is marked as a first conical surface 66025, to facilitate a mounting of the first oil pipe 630. Multiple oil inlet holes 66023 are arranged on a side wall of the filter tube 66021. In some embodiment, an oil inlet hole 66023 is a rectangular through hole. The multiple rectangular through holes are evenly distributed along a circumference of the filter bracket 6602. The rectangular through holes may increase a filtering area. The second filter body may be a filter sponge or a filter screen covering the rectangular through hole. For example, it may be a nylon filter screen. The nylon filter screen covers the rectangular through hole to filter the lubricating oil entering the oil pump 620. Specifications of the filter screen may be determined according to a working environment and an oil filter hole inside the oil pump 620, so as to achieve efficient filtering of large particle impurities in the lubricating oil and prevent the oil pump 620 from clogging. The filter bracket 6602 may also be a nylon bracket, and the nylon filter screen and the nylon bracket are integrally injection molded.

Please refer to FIG. 6 and FIG. 12. As an example, the oil reservoir outlet 601 is a circular hole, and the oil nozzle 6601 is a cylindrical tube body that matches the circular hole. A connection joint of the oil nozzle 6601 and the oil reservoir outlet 601 is provided with a flange fully matched a casing of the oil reservoir, which may prevent oil leakage at the oil nozzle 6601. In other embodiments, the oil nozzle 6601 and the oil reservoir outlet 601 may also be an integrated structure. In some embodiments, an end of the oil nozzle 6601 away from the oil reservoir outlet 601 is provided with an inwardly contracting conical surface, which is marked as a second conical surface 66011. A design of the conical surface is conducive to guiding the first oil pipe 630 to be easily sleeved and mounted on the oil nozzle 6601.

Figure 14:
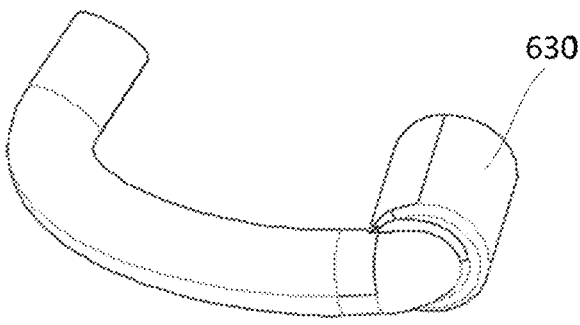
FIG. 14 is a schematic structural view of the first oil pipe in FIG. 12.

Please refer to FIG. 12 and FIG. 14. In this embodiment, the first oil pipe 630 is made of rubber material, and an inner diameter of an end of the first oil pipe 630 connected with the oil nozzle 6601 fits an outer diameter of the oil nozzle 6601. During mounting, the first oil pipe 630 is sleeved on the oil nozzle 6601, with an elasticity of the rubber material, the oil nozzle 6601 tightens the first oil pipe 630, and then ties a tie around an outside of the first oil pipe 630, which may effectively prevent oil leakage between the oil nozzle 6601 and the first oil pipe 630, and also prevent the first oil pipe 630 from falling off the oil nozzle 6601 during use. This filtering structure has a small overall volume and may be used in small oil reservoirs or irregular blow molded oil reservoirs with oil nozzles.

Please refer to FIG. 15 through FIG. 19. In one embodiment, the oil reservoir cap 610 includes a cover body 611, a cavity 612 arranged in the cover body 611, and a one-way venting structure 613 arranged in the cavity 612. An inner wall of the cover body 611 is provided with a thread structure 6111 matches an external thread of the oil reservoir inlet 602. The cavity 612 is arranged inside the cover body 611 and is concave toward the oil reservoir 600. A side of the cavity 612 away from the oil reservoir 600 is provided with an air inlet 6112 that communicates with an outside, and a side of the cavity 612 facing the oil reservoir 600 is provided with an air outlet 6121. A diameter of the air outlet 6121 is smaller than a diameter of the air inlet 6112. Only a small amount of lubricating oil may pass through the air outlet 6121. The one-way venting structure 613 is arranged inside cavity 612. The one-way venting structure 613 allows air to enter the oil reservoir 600 from the outside, but can prevent liquid in the oil reservoir 600 from overflowing from the one-way venting structure. It can not only replenish air in time during a suction process of the oil pump 620, but also prevent the liquid in the oil reservoir 600 from overflowing, thereby causing losses and leakage pollution.

Figure 15:
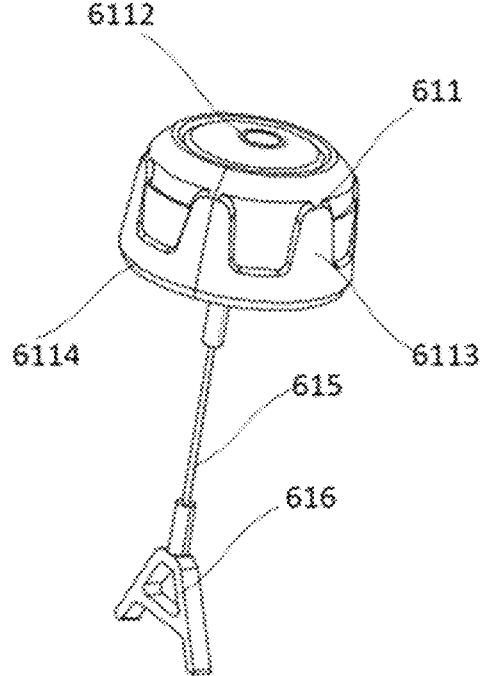
FIG. 15 is a schematic structural view of an oil reservoir cap in an embodiment of the power tool of the disclosure.

Please refer to FIG. 15. In one example, anti-skid protrusions 6113 are arranged on an outer wall of the cover body 611. The anti-skid protrusions 6113 are arranged at intervals along a circumferential direction of the cover body 611. When force is required, the anti-skid protrusions 6113 may increase a certain amount of friction. For example, the anti-skid protrusion 6113 is a hat-shaped structure, with crowns arranged at intervals and brims connected together to form a circle of patterns, which has a certain aesthetic effect.

Figure 17:
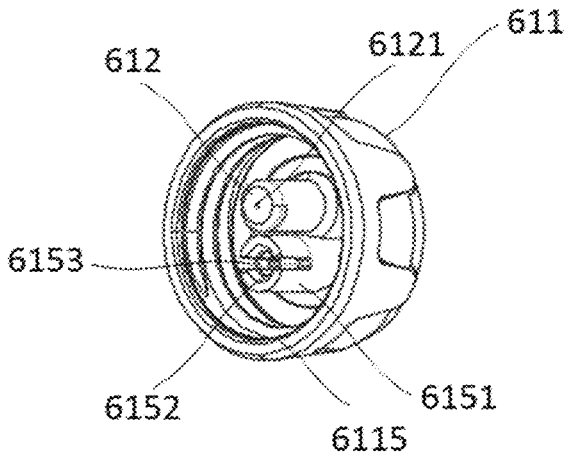
FIG. 17 is a schematic view of an internal structure of the oil reservoir cap in an embodiment of the power tool of the disclosure.
Figure 18:
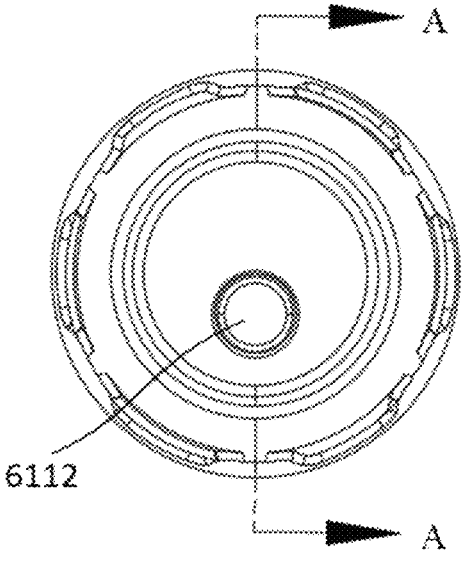
FIG. 18 is a front structural schematic view of the oil reservoir cap in an embodiment of the power tool of the disclosure.

Please refer to FIG. 15 and FIG. 17. In one embodiment, one end of the cover body 611 facing the oil reservoir 600 is provided with an inwardly contracting conical surface, marked as a third conical surface 6114, and a matching surface 6115 that matches the oil reservoir 600. The matching surface 6115 may completely fit the oil reservoir 600. A conical surface design may prevent oil leakage in the oil reservoir 600.

Figure 16:
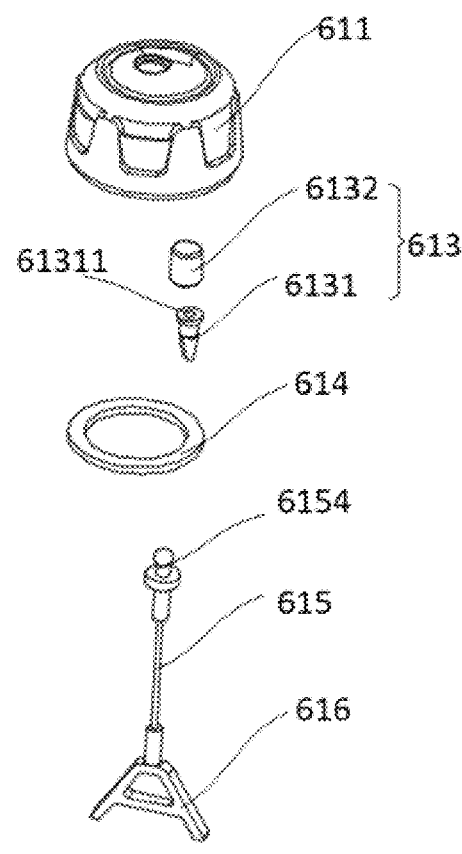
FIG. 16 is an exploded schematic view of the oil reservoir cap in an embodiment of the power tool of the disclosure.

Please refer to FIG. 16 and FIG. 17. In one embodiment, the one-way venting structure 613 includes a one-way air intake valve 6131, and an air intake slit 61311 is arranged at an end of the one-way air intake valve 6131 toward the air inlet hole 6112. The one-way air intake valve 6131 allows the air to enter from the outside of the oil reservoir cap 610 to an inside of the oil reservoir 600, but does not allow the liquid in the oil reservoir 600 to overflow. The one-way air intake valve 6131 is a rubber component with a certain degree of elasticity and a one-way venting function that may allow air to pass into the oil reservoir 600, but can not leak oil to the outside. A filter body for filtering the air is mounted on one end of the one-way air intake valve 6131 facing the air inlet hole 6112, which is marked as a third filter body 6132. The third filter body 6132 may be a copper powder sintered filter element or a filter element made of other venting materials such as PE, which is a venting filter element of 20 to 100 mesh, preferably a venting filter element of 60-80 mesh with a function of dust filtration protection and can be mounted and pressed on an upper part of the one-way air intake valve 6131 to block the air inlet 6112. When the oil pump 620 needs to absorb oil, an internal pressure of the oil reservoir 600 changes, and the air will pass through the third filter body 6132, then enter the one-way air intake valve 6131 through the air intake slit 61311 of the one-way air intake valve, and then enter the inside of the oil reservoir 600 through the air outlet 6121 at a bottom of the cavity 612. When a handheld cutting tool is placed sideways or upside down, the lubricating oil inside the oil reservoir 600 will enter the oil reservoir cap 610. Since the air outlet 6121 on the cavity 612 has a small area, only a small part of the oil can pass through, and the one-way air intake valve 6131 is reversely sealed, so it is difficult for oil to penetrate the copper powder filter element, thereby achieving a sealing of the oil reservoir cap 610 and preventing oil from overflowing from the oil reservoir cap 610.

Figure 19:
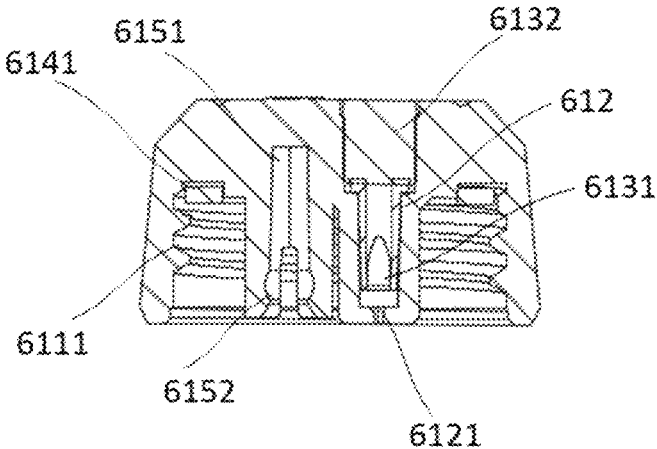
FIG. 19 is a sectional view along A-A direction of FIG. 18.
Figure 20:
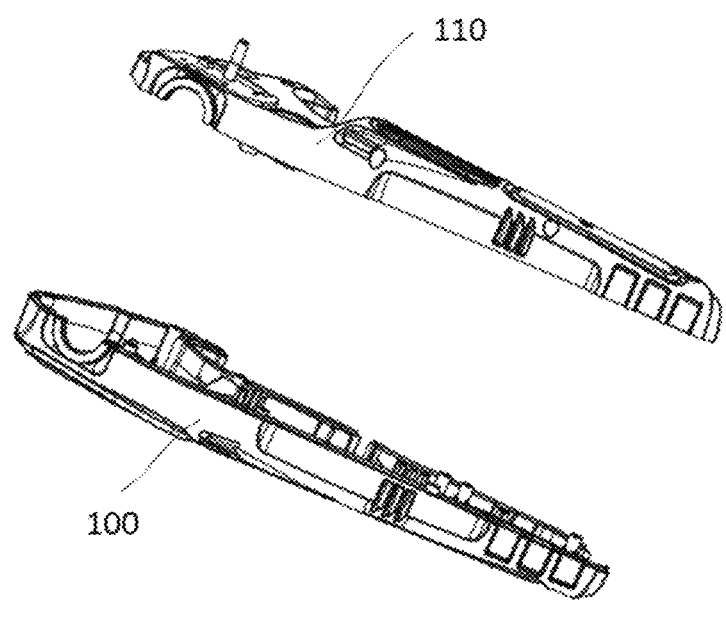
FIG. 20 is an exploded schematic view of the housing of the power tool in an embodiment of the disclosure.

Please refer to FIG. 16 and FIG. 19. In one embodiment, an inside of the cover body 611 is further provided with a sealing ring 614, which is preferably made of elastic silicone material, which may be in a form of a conventional circular gasket. In this embodiment, an annular groove 6141 is arranged at an end of the cover body 611 close to the air inlet 6112. With an elasticity of the silicone material, an inside of annular groove 6141 may be filled by the sealing ring 614, so that there is a larger sealing surface between the cover body 611 and the oil reservoir inlet 602.

Please refer to FIG. 15 through FIG. 17 and FIG. 19. The cover body 611 is further provided with a pulling wire 615 to prevent the cover body 611 from being lost. A first end of the pulling wire 615 is mounted in the cover body 611. A second end of the pulling wire 615 extends to the inside of the oil reservoir 600 and is connected with a blocking body 616 that may enter the inside of the oil reservoir 600. The pulling wire 615 is mounted at a different position from the cavity 612 to prevent the oil in the oil reservoir 600 from leaking from a mounting position of the pulling wire 615. A connection method between the pulling wire 615 and the cover body 611 is not limited and may be any suitable connection means.

Please refer to FIG. 16, FIG. 17 and FIG. 19. In one embodiment, a mounting hole 6151 of the pulling wire 615 is arranged inside the cover body 611. The mounting hole 6151 is located on one side of the cavity 612. The pulling wire 615 is provided with a mounting structure coupled with the mounting hole 6151 at one end of the cover body 611 and the mounting structure is threaded or interference inserted into the mounting hole 6151. In some embodiments, a circular concave cavity 6152 is arranged in the mounting hole 6151. One end of the mounting hole 6151 facing the pulling wire 615 is provided with an opening groove 6153 for increasing an elasticity of a wall of the mounting hole 6151. The first end of the pulling wire 615 is provided with a sphere 6154 matching the circular concave cavity 6152, the sphere 6154 and the pulling wire 615 are integrally formed by injection molding, and the sphere 6154 is clamped into the circular concave cavity 6152. This arrangement allows the pulling wire 615 to rotate at any angle, which is not only flexible in rotation, but also can prevent the first end of the pulling wire 615 from falling off or getting entangled due to the rotation.

Please refer to FIG. 6 and FIG. 15. In one embodiment, the blocking body 616 is an elastically deformable bracket. The bracket is integrally formed with the pulling wire 615 and may enter the oil reservoir 600 from the oil reservoir inlet 602 along a longitudinal direction of the blocking body 616. After entering the oil reservoir 600, it may no longer be pulled out from the oil reservoir inlet 602 without external force. For example, the blocking body 616 has an "A"-shaped tapered structure, and the pulling wire 615 is connected with a tip of the "A"-shaped shape. A size of an opening end of the "A"-shaped shape is larger than a diameter of the oil reservoir inlet 602. Using this structure of the blocking body 616 is conducive to an elastic compression deformation of the blocking body 616 when it is taken out, so as to be taken out from the oil reservoir inlet 602. In other embodiments, the blocking body 616 may also be a blocking rod (not shown in the figure). The pulling wire 615 is connected with a center of the blocking rod. The blocking rod may enter the oil reservoir inlet 602 along an axial direction, and is blocked by the oil reservoir inlet 602 when it is lifted. A diameter of the blocking rod is smaller than the diameter of the oil reservoir inlet 602, and may enter an inner cavity of the oil reservoir 600 from the oil reservoir inlet 602. A length of the blocking rod is greater than the diameter of the oil reservoir inlet 602 and smaller than a minimum width of the inner cavity of the oil reservoir 600. When the pulling wire 615 is pulled, the blocking rod is laterally blocked on the oil reservoir inlet 602 under dual effects of the pulling wire 615 and gravity.

Please refer to FIG. 1, FIG. 2 and FIG. 20 through FIG. 22. A housing system of the disclosure may be used to mount either a brushed motor or a brushless motor, which solves a problem that a brushed motor and a brushless motor may not be compatible in one housing system. The housing 1 of the disclosure includes a first housing 100 and a second housing 110. A plurality of first supporting ribs 101 are arranged inside the first housing 100. A plurality of second supporting ribs 111 are arranged at a position of an interior of the second housing 110 corresponding to the first supporting ribs 101 in the first housing 100. After the first housing 100 and the second housing 110 are buckled together, the first supporting ribs 101 and the second supporting ribs 111 surround to form a motor accommodating cavity 120 that matches the brushed motor. The housing 1 further includes a motor supporting pad 130. The motor supporting pad 130 is detachably mounted on the first supporting ribs 101 and the second supporting ribs 111, and an inner diameter of the motor supporting pad 130 fits a size of the brushless motor.

Figure 21:
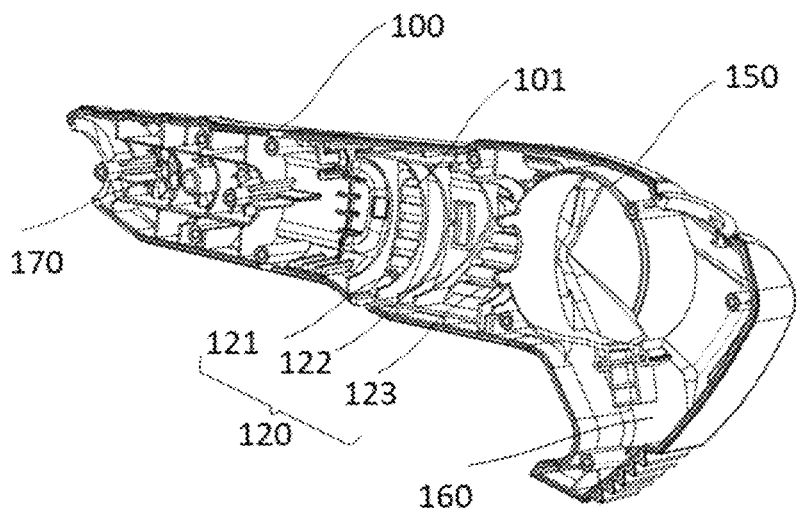
FIG. 21 is a schematic structural view of a first housing in FIG. 20.
Figure 22:
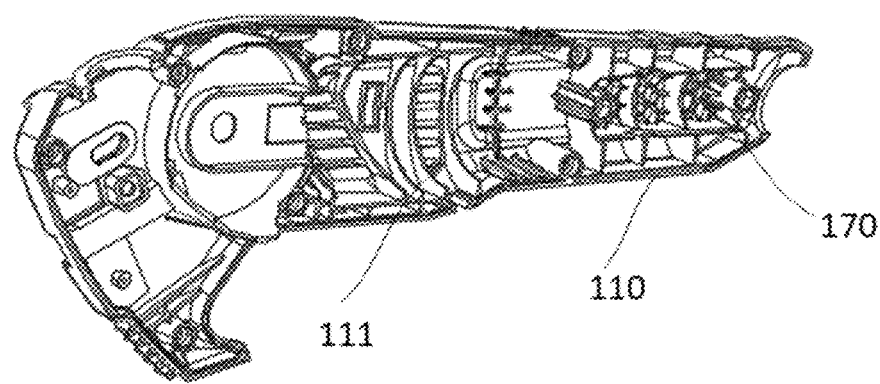
FIG. 22 is a schematic structural view of a second housing in FIG. 20.

Please refer to FIG. 2, FIG. 21 and FIG. 22. The first supporting ribs 101 and the first housing 100 are of an integrated structure. The second supporting ribs 111 and the second housing 110 are of an integrated structure. Side of the first supporting ribs 101 and the second supporting ribs 111 facing the motor accommodating cavity 120 are provided with arc-shaped matching surfaces matched with the brushed motor 21. The first supporting ribs 101 and the second supporting ribs 111 divide the motor accommodating cavity 120 into a first cavity 121, a second cavity 122 and a third cavity 123. When the driving motor 2 is mounted, a head of the driving motor 2 is located at the first cavity 121. A main body of the driving motor 2 is located in the second cavity 122, and an output end of the driving motor 2 is located in the third cavity 123.

Figure 23:
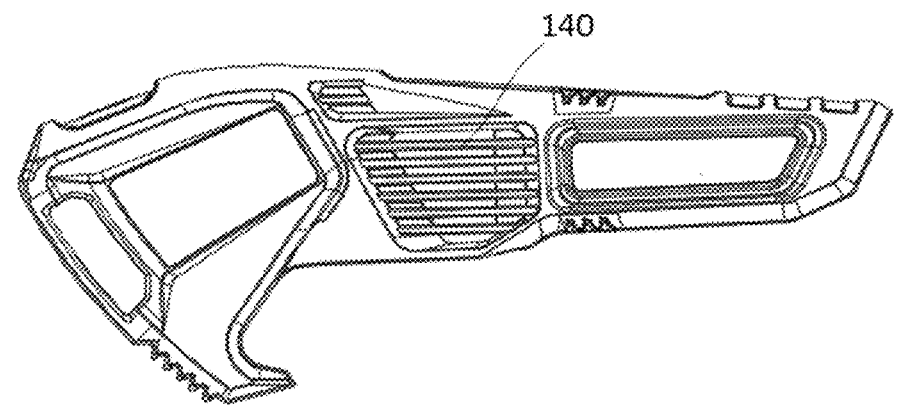
FIG. 23 is a rear view of FIG. 21.
Figure 24:
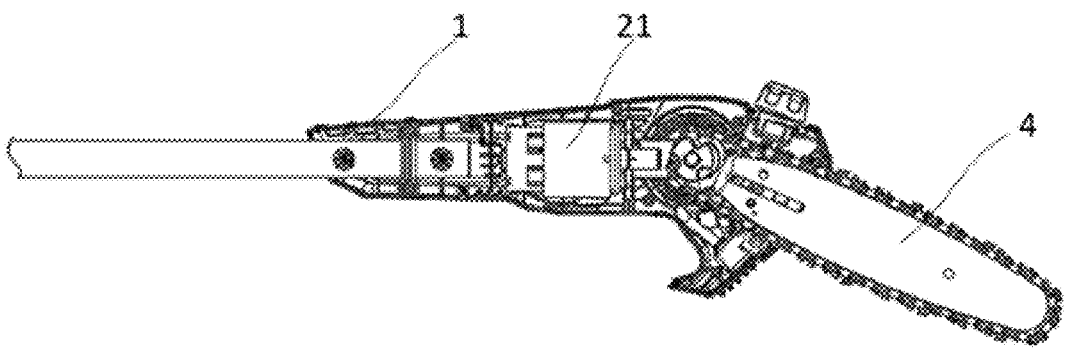
FIG. 24 is a structural schematic view of a brushed motor mounted in the housing of the power tool of the disclosure in an embodiment.

Please refer to FIG. 21 through FIG. 23. In one embodiment, the first housing 100 and the second housing 110 are both provided with windshields 140 corresponding to the motor accommodating cavity 120, and air inlets at front and rear ends of the driving motor 2 are located at the windshields 140 of the housing, so that a heat dissipation effect of the driving motor 2 is better and the driving motor 2 may be ensured to work for a long time.

Please refer to FIG. 21 through FIG. 25 and FIG. 27. The motor supporting pad 130 is a rubber blocking ring, which includes a first rubber pad 131 arranged on the first supporting ribs 101 and a second rubber pad 132 arranged on the second supporting ribs 111. The first rubber pad 131 and the second rubber pad 132 are mounted opposite each other. A side of the motor supporting pad 130 in contact with the first supporting ribs 101 and the second supporting ribs 111 is provided with a washer groove 133 for accommodating the supporting ribs. A side of the motor supporting pad 130 in contact with the brushless motor 22 is provided with an arc-shaped washer matching surface 134 that matches the brushless motor 22. In addition, the arc-shaped washer matching surface 134 is further provided with a clamping groove 135 for accommodating housing supporting pillars of the brushless motor 22. After the motor supporting pad 130 is mounted on the first supporting ribs 101 and the second supporting ribs 111, the brushless motor 22 and the motor supporting pad 130 may be completely fitted. In some embodiments, the motor supporting pad 130 is arranged on the supporting ribs in the second cavity 122. At this time, the motor supporting pad 130 is located on a main body of the brushless motor 22, so that the motor supporting pad 130 may block windshields at the first cavity 121 from windshields at the third cavity 123. An air inlet at front end of the brushless motor 22 and a heat dissipation of a fan blades at rear end may be effectively separated to avoid random wind and wind dissipation, which will affect an effective heat dissipation of the motor. In addition, the motor supporting pad 130 is made of rubber, which also has an effect of absorbing shock and isolating noise.

Figure 25:
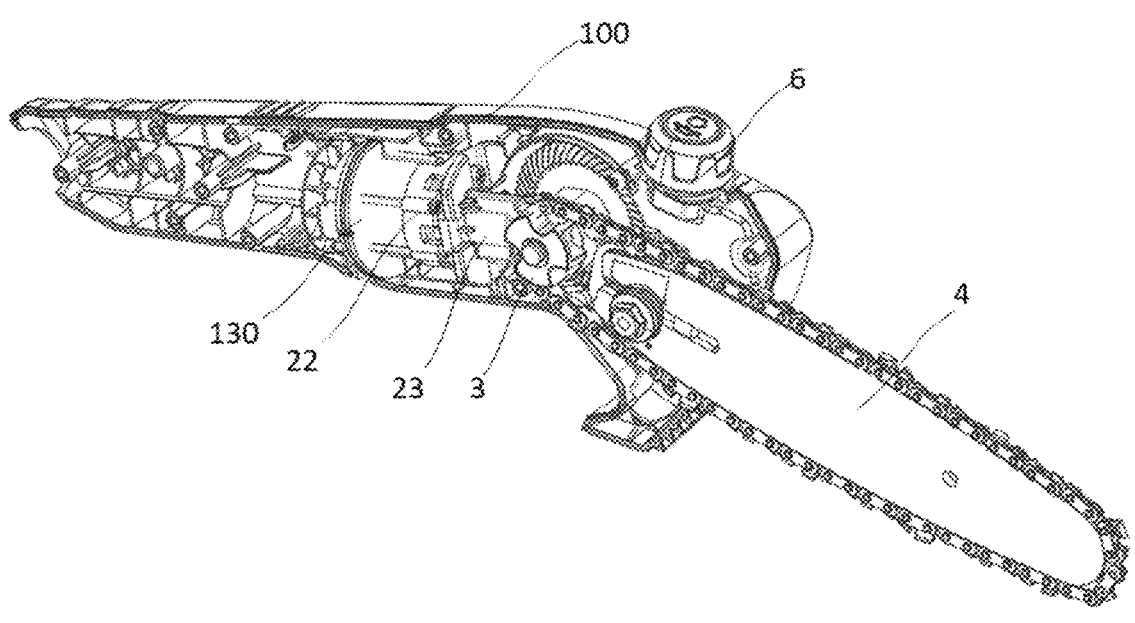
FIG. 25 is a structural schematic view of a brushless motor mounted in the housing of the power tool of the disclosure in an embodiment.
Figure 26:
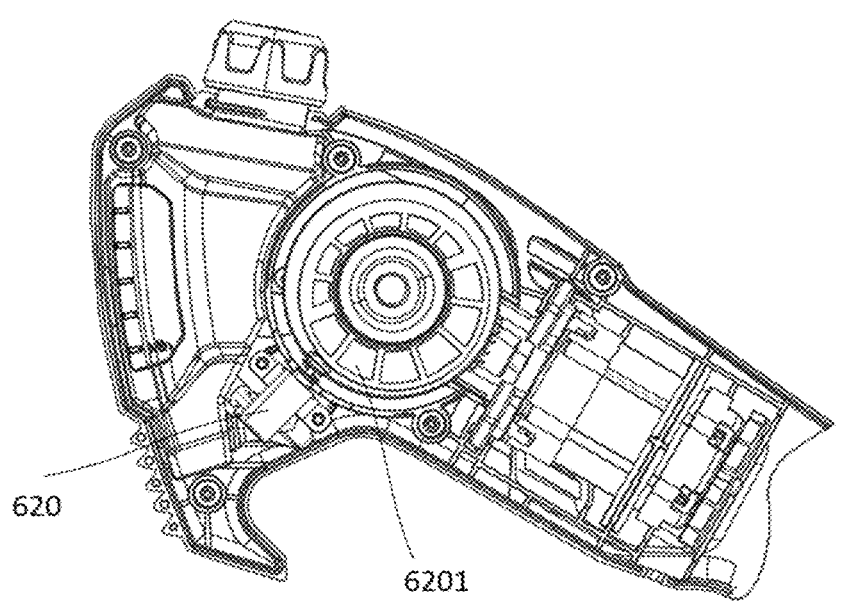
FIG. 26 is a partially enlarged schematic view in FIG. 25.
Figure 27:
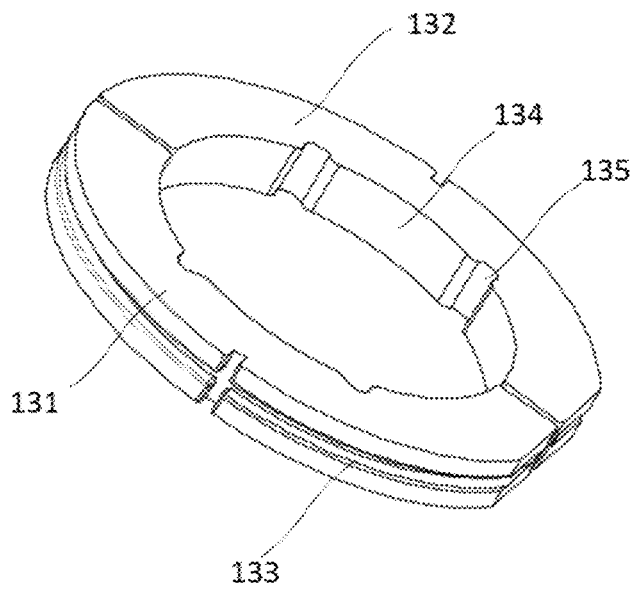
FIG. 27 is a schematic view of a motor supporting pad in an embodiment of the power tool of the disclosure.
Figure 28:
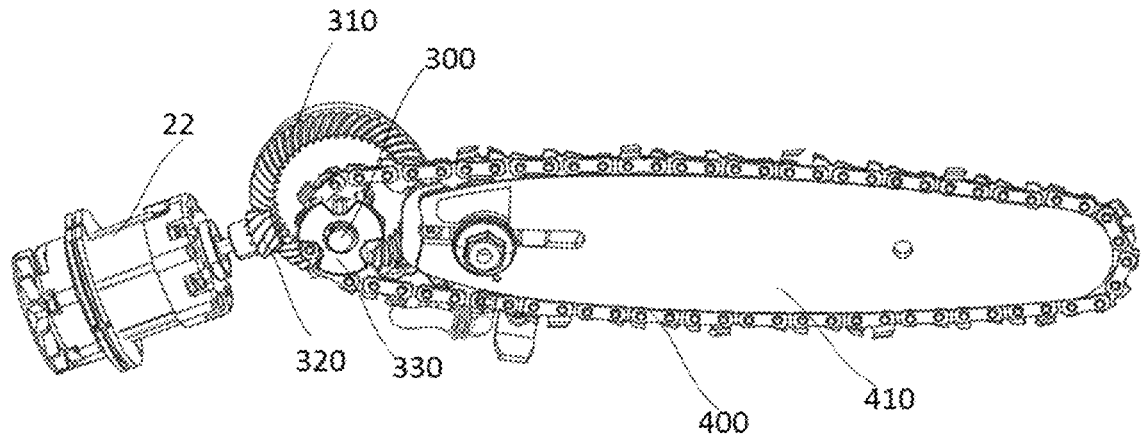
FIG. 28 is an assembly schematic view of a driving device, a transmission device and a cutting device of the power tool of the disclosure.

Please refer to FIG. 25 and FIG. 27. It should be noted that a number of the motor supporting pads 130 in the disclosure may be one or more, specifically to support the motor stably. Considering that an output flange of the driving motor 2 in conventional cutting tools is usually fixed on the housing through a motor bracket, and too many motor supporting pads 130 will enable an assembly to be more difficult, in this embodiment, there is only one motor supporting pad 130, and the motor supporting pad 130 is clamped on the first supporting ribs 101 and the second supporting ribs 111 through the washer groove 133. The brushless motor 22 is mounted in the motor supporting pad 130, and the output flange of the motor is mounted in the housing 1 through a motor bracket 23. The motor bracket 23 is clamped in a groove surrounded by supporting ribs inside the third cavity 123. The motor bracket 23 may provide support for a rotation of the output shaft of the driving motor 2 and a sprocket driving shaft 300.

Please refer to FIG. 2, FIG. 21, FIG. 25, FIG. 26 and FIG. 28. The housing 1 is further provided with a transmission device accommodating cavity 150 and an oil storage device accommodating cavity 160. The transmission device 3 is connected with an output end of the driving motor 2. Therefore, the transmission device accommodating cavity 150 is arranged on one side of the output end of the driving motor 2. The oil storage device accommodating cavity 160 is arranged on a side of the transmission device accommodating cavity 150 away from the driving motor 2 and is used for mounting the oil storage device 6. The transmission device accommodating cavity 150 includes a circular housing arranged on the first housing 100, and a size of the circular housing should be larger than a size of the transmission device 3 at its maximum position. The transmission device 3 includes a driving bevel gear 320, a driven bevel gear 310, the sprocket driving shaft 300 and a sprocket 330. The driving bevel gear 320 is mounted on the output shaft of the driving motor 2, and the driven bevel gear 310 is rotatably mounted in the circular housing of the transmission device accommodating cavity 150 and meshes with the driving bevel gear 320. The sprocket driving shaft 300 is arranged in a direction perpendicular to the driven bevel gear 310. A first end of the sprocket driving shaft 300 is rotatably connected with the motor bracket 23, and a second end of the sprocket driving shaft 300 is sequentially mounted with the sprocket 330, the driven bevel gear 310, and an oil pump cam 6201 along its axial direction. The cutting device 4 is mounted on the housing 1 and driven by the sprocket 330. The driving motor 2 is started, the output shaft of the motor drives the driving bevel gear 320 to rotate, the driving bevel gear 320 drives the driven bevel gear 310 to rotate, then drives the sprocket driving shaft 300 to rotate, and the sprocket driving shaft 300 drives the sprocket 330 to rotate. The cutting device 4 completes the cutting action driven by the sprocket 330. At the same time, the oil pump cam 6201 rotates with the sprocket driving shaft 300. Since a plunger of the plunger pump is against an edge of the oil pump cam 6201, as the oil pump cam 6201 rotates, the plunger pump completes a suction action and provides lubricating oil to the cutting device 4.

Figure 29:
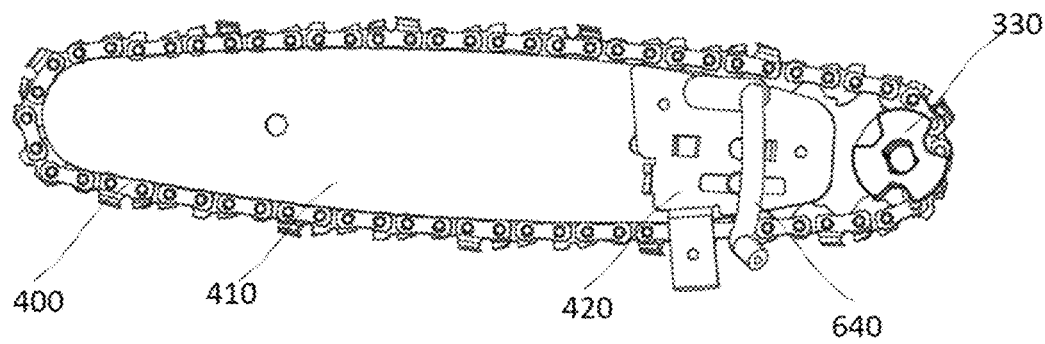
FIG. 29 is a schematic structural view of the cutting device in an embodiment of the power tool of the disclosure.
Figure 30:
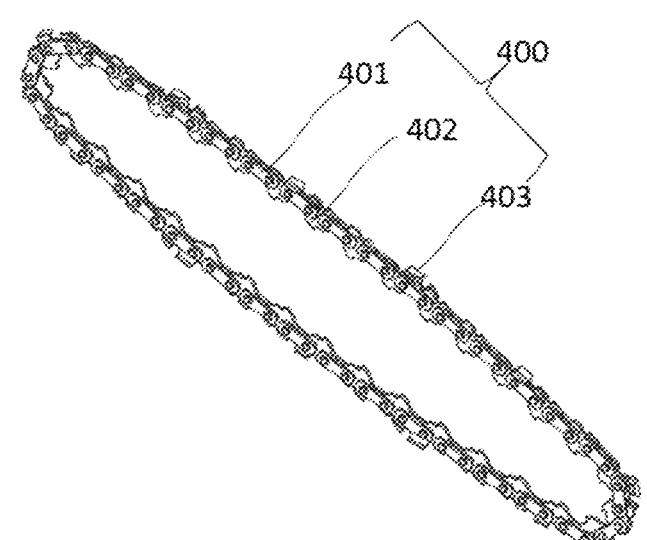
FIG. 30 is a schematic structural view of a saw chain in FIG. 29.
Figure 31:
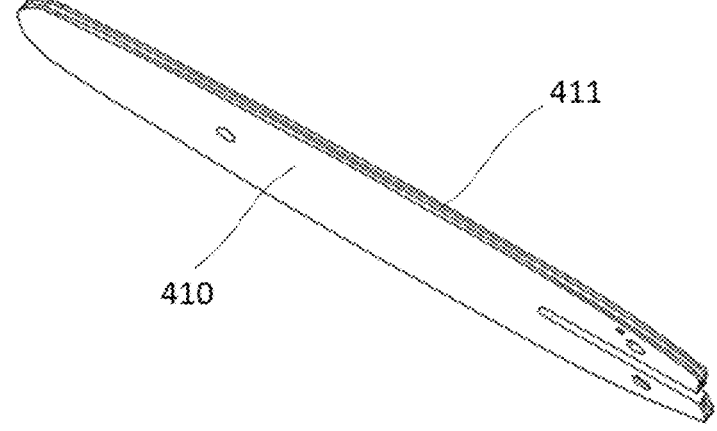
FIG. 31 is a schematic structural view of a guide bar in FIG. 29.

Please refer to FIG. 29 through FIG. 31. In one example, the cutting device 4 includes a saw chain 400 and a guide bar 410 that guides the saw chain 400. One end of the saw chain 400 is mounted on the sprocket 330. The guide bar 410 is fixed on the housing 1 through a bar plate pad 420 and bolts. A guiding groove 411 is arranged on an outer circumference of the guide bar 410, and the saw chain 400 is clamped in the guiding groove 411 of the guide bar 410. The saw chain 400 includes a tie strap 401, a drive link 402 and a cutter 403. The cutter 403 is detachably fixed on an outside of the tie strap 401, and the drive links 402 are detachably fixed on an inside of the tie strap 401. The drive links 402 are all matched, clamped and connected with the guiding groove 411. The saw chain 400 is driven by the sprocket 303 to continuously rotate around a circumference of the guide bar 410. The drive link 402 of the saw chain 400 are clamped and connected in the guiding groove 411 of the guide bar 410 to ensure that the saw chain 400 does not separate from the guide bar 410.

Please refer to FIG. 1, FIG. 2 and FIG. 22. The power tool of the disclosure further includes a connecting rod 5 and a power cable (not shown in the figure). A first end of the connecting rod 5 is mounted in the housing 1, and a second end is provided with a control handle. The power cable is arranged inside the connecting rod 5 and is connected with driving motor 2. The housing 1 is provided with a connecting rod accommodating cavity 170. The connecting rod accommodating cavity 170 is arranged at one end of the housing 1 away from the cutting device 4. The connecting rod 5 is inserted into the connecting rod accommodating cavity 170 and is fixed with screws and a fastening lock. The connecting rod 5 may be a telescopic rod. Through adjusting a length of the telescopic rod, it may be extended to a high place to cut tree trunks or branches.

It should be noted that the parts of the power tool of the disclosure that are not described in detail may be implemented by structures in the conventional art, and will not be described again here.

In summary, the oil storage device of the power tool of the disclosure is provided with the filtering structure at the joint of the oil pump and the first oil pipe. Through the filtering structure, large impurities in the lubricating oil may be filtered out, thereby avoiding the clogging of the oil pump and enabling it to effectively lubricate the saw chain. The power tool adopting the oil storage device of the disclosure can increase the duration life of the tool.

The above-mentioned embodiments merely illustrate the principles and effects of the disclosure, but are not intended to limit the disclosure. Anyone skilled in the art may modify or change the above embodiments without departing from the range of the disclosure. Therefore, all equivalent modifications or changes made by those with ordinary knowledge in the technical field without departing from the range and technic disclosed in the disclosure should still be covered by the claims of the disclosure.

What is claimed is:

1. A power tool, comprising:
a housing;
a driving device, arranged in the housing;
a cutting device, arranged in the housing and driven by the driving device; and
an oil storage device, arranged in the housing and configured to provide lubricating oil to the cutting device;
wherein, the oil storage device comprises an oil reservoir and an oil pump, the oil reservoir is connected with the oil pump through a first oil pipe, a filtering structure is arranged between the first oil pipe and the oil reservoir to filter the lubricating oil entering the oil pump from the oil reservoir, and the oil reservoir provides the lubricating oil to the cutting device through the oil pump; and
wherein the oil reservoir is provided with an oil reservoir outlet connected with the first oil pipe, the filtering structure comprises a claw, a first filter body and a filter spring, the claw is arranged on an end of the first oil pipe connected with the oil reservoir outlet, the claw is provided with a first oil inlet hole communicating with the first oil pipe, the first filter body is arranged in the claw, and the filter spring is sleeved on the claw and fixes the first filter body in the claw.

2. The power tool according to claim 1, wherein the claw comprises a pipe part, a claw plate and claw teeth connected sequentially, an outer diameter of the pipe part fits an inner diameter of the first oil pipe, a diameter of the claw plate is larger than an outer diameter of the first oil pipe, the claw plate is provided with the first oil inlet hole communicating with the pipe part, and the claw teeth are arranged at intervals along a circumferential direction of the claw plate to enclose an accommodating cavity of the first filter body.

3. The power tool according to claim 1, wherein the filter spring comprises a cylindrical spring and a conical spring, the cylindrical spring is sleeved outside the claw, and the conical spring is blocked on an opening of the claw.

4. The power tool according to claim 1, wherein a joint of the first oil pipe and the oil reservoir outlet is provided with a leak-proof structure, the leak-proof structure comprises a cylindrical outer wall, a first flange and a second flange arranged on two sides of the cylindrical outer wall, the cylindrical outer wall fits on an outer wall of the first oil pipe and coupled with the oil reservoir outlet, the first flange is located inside the oil reservoir outlet, the second flange is located outside the oil reservoir outlet, and the first flange and the second flange are pressed tightly on surrounding walls of the oil reservoir outlet and seal the surrounding walls of the oil reservoir outlet.

5. The power tool according to claim 1, wherein a joint of the oil reservoir and the first oil pipe is provided with an oil nozzle protruding from a surface of the oil reservoir, the filtering structure comprises a filter bracket and a second filter body, the second filter body is arranged in the filter bracket, and the filter bracket is arranged in the oil nozzle.

6. The power tool according to claim 5, wherein the filter bracket comprises a filter tube and a blocking part arranged at an end of the filter tube, the blocking part is provided with a through hole communicating with the filter tube, an outer diameter of the filter tube fits an inner diameter of the oil nozzle, and an outer diameter of the blocking part is larger than an outer diameter of the oil nozzle.

7. The power tool according to claim 6, wherein a side wall of the filter tube is provided with a plurality of second oil inlet holes along a circumference, and the second filter body is distributed in the second oil inlet holes.

8. The power tool according to claim 7, wherein the second filter body is a filter screen, and the filter bracket and the filter screen are integrally structured.

9. The power tool according to claim 5, wherein an inner diameter of the first oil pipe fits an outer diameter of the oil nozzle, and the first oil pipe is tightly sleeved on the oil nozzle.

10. The power tool according to claim 1, wherein the oil storage device further comprises an oil reservoir cap, the oil reservoir cap comprises a cover body, a cavity, a one-way venting structure and a pulling wire, the cover body is screwed to the oil reservoir, and the cavity is arranged inside of the cover body and is concave toward the oil reservoir, a side of the cavity away from the oil reservoir is provided with an air inlet hole, a side of the cavity facing the oil reservoir is provided with an air outlet, the one-way venting structure is arranged in the cavity, a first end of the pulling wire is connected to the cover body on one side of the cavity, and a second end of the pulling wire extends into the oil reservoir to be connected with a blocking body that is capable of entering into the oil reservoir.

11. The power tool according to claim 10, wherein the one-way venting structure comprises a one-way air intake valve and a third filter body, the one-way air intake valve is arranged in the cavity, and the third filter body is arranged in the air inlet hole to seal the air inlet hole.

12. The power tool according to claim 1, wherein the housing comprises a first housing, a second housing and a motor supporting pad, an interior of the first housing is provided with a plurality of first supporting ribs, an interior of the second housing is provided with a plurality of second supporting ribs, after the first housing is fastened with the second housing, the first supporting ribs and the second supporting ribs enclose to form a motor accommodating cavity that matches a brushed motor, the motor supporting pad is detachably arranged on the first supporting rib and the second supporting rib, and an inner diameter of the motor supporting pad fits a size of a brushless motor.

13. The power tool according to claim 12, wherein a side surface of the motor supporting pad in contact with the first supporting ribs and the second supporting ribs is provided with a washer groove to accommodate the supporting ribs, and the side surface of the motor supporting pad in contact with the brushless motor is provided with an arc-shaped matching surface matched with the brushless motor.

14. The power tool according to claim 13, wherein both the first housing and the second housing are provided with windshields corresponding to the motor accommodating cavity, and the motor supporting pad separates the windshields at a head of a motor from the windshields at an output end of the motor.

15. A power tool, comprising:
a housing;
a driving device, arranged in the housing;
a cutting device, arranged in the housing and driven by the driving device; and
an oil storage device, arranged in the housing and configured to provide lubricating oil to the cutting device; wherein,
the oil storage device comprises an oil reservoir and an oil pump, the oil reservoir is connected with the oil pump through a first oil pipe, a filtering structure is arranged between the first oil pipe and the oil reservoir to filter the lubricating oil entering the oil pump from the oil reservoir, and the oil reservoir provides the lubricating oil to the cutting device through the oil pump; and
the filtering structure comprises a claw and a first filter body, the claw is disposed within the first oil pipe, and the first filter body is arranged in the claw.

16. The power tool according to claim 15, wherein the filtering structure further comprises a filter spring, the filter spring being sleeved over the claw to secure the first filter body in the claw.

* * * * *